United States Patent
Ge

(10) Patent No.: US 8,255,012 B2
(45) Date of Patent: Aug. 28, 2012

(54) MOBILE PHONE AND STATUS CONTROL METHOD THEREOF

(75) Inventor: Chi-Sheng Ge, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 12/915,047

(22) Filed: Oct. 29, 2010

(65) Prior Publication Data
US 2011/0269514 A1    Nov. 3, 2011

(30) Foreign Application Priority Data
Apr. 28, 2010  (CN) .......................... 2010 1 0157209

(51) Int. Cl.
*H04B 1/16* (2006.01)
*H04B 1/38* (2006.01)
*G08C 17/00* (2006.01)

(52) U.S. Cl. .................. 455/574; 455/343.2; 455/343.4; 370/311

(58) Field of Classification Search .......... 455/230–231, 455/418–420, 432.1–432.3, 434, 435.1–435.3, 455/436–444, 450, 509, 514, 517, 550.1, 455/556.2, 560–561, 574, 127.1, 127.5, 343.1–343.5, 455/423–425, 572; 370/218–220, 310, 310.2, 370/328–329, 331, 338, 341, 349–350, 473, 370/394, 902, 912, 311–313, 486, 491; 713/310, 713/320–324, 330, 340
See application file for complete search history.

(56) References Cited

U.S. PATENT DOCUMENTS

| | | | | |
|---|---|---|---|---|
| 5,955,869 | A * | 9/1999 | Rathmann | 320/132 |
| 6,025,695 | A * | 2/2000 | Friel et al. | 320/106 |
| 6,473,607 | B1 * | 10/2002 | Shohara et al. | 455/343.1 |
| 6,816,977 | B2 * | 11/2004 | Brakmo et al. | 713/323 |
| 7,187,934 | B2 * | 3/2007 | Turina et al. | 455/453 |
| 7,356,726 | B2 * | 4/2008 | Shimoyama et al. | 713/600 |
| 7,656,839 | B2 * | 2/2010 | Backes et al. | 370/331 |
| 7,751,374 | B2 * | 7/2010 | Donovan | 370/336 |
| 7,855,977 | B2 * | 12/2010 | Morrison et al. | 370/252 |
| 7,920,530 | B2 * | 4/2011 | Donovan | 370/338 |

* cited by examiner

*Primary Examiner* — Meless Zewdu
(74) *Attorney, Agent, or Firm* — Altis Law Group, Inc.

(57) ABSTRACT

A mobile phone and a status control method adapted for the mobile phone are provided. The mobile phone communicates with a wireless network, such as GPRS. The mobile phone includes a data reception unit, a processing unit, and a storage unit. The processing unit records a start time and a stop time of each event which defines the running of an application program when data reception unit transfers data packet of the application program, and calculates an average interval time of the application program, and stores the average interval time. When a waiting time reaches the average interval time of the application program in the ready state, the mobile phone enters the standby state in advance, and thus the mobile phone does not need send updated location information to the SGSN and saves a lot of power.

11 Claims, 5 Drawing Sheets

| Port number | Type of data packet |
|---|---|
| 80 | Web |
| 100 | Map |
| 60 | MSN |
| ... | ... |

FIG. 2

| Type | Start time and stop time of each event | | | | | | | | | | | | | Average interval time |
|---|---|---|---|---|---|---|---|---|---|---|---|---|---|---|
| | a first event | | a second event | | ... | an (M-1)th event | | an Mth event | | ... | an (X-1)th event | | an Xth event | |
| Web | 08:09:59 | 08:11:50 | 08:12:33 | 08:12:43 | ... | 09:09:59 | 09:11:10 | 09:11:33 | 09:12:43 | ... | 10:09:59 | 10:16:50 | 10:17:06 | 10:20:43 | 25s |
| | | 43s | | | | 23s | | | | | | 16s | | | |
| Map | 13:31:06 | 13:32:26 | 13:33:01 | 13:36:02 | ... | 16:09:59 | 16:11:50 | 16:12:33 | 16:16:43 | ... | | | | | 40s |
| | | 35s | | | | 43s | | | | | | | | | |
| MSN | 10:11:35 | 10:12:16 | 10:12:49 | 10:13:15 | ... | 12:09:59 | 12:11:33 | 12:11:44 | 12:12:43 | ... | 15:09:59 | 15:11:50 | 15:12:10 | 15:12:43 | 13s |
| | | 33s | | | | 11s | | | | | | 20s | | | |
| ... | ... | | ... | | ... | ... | | ... | | ... | ... | | ... | | ... |

FIG. 3

MOBILE PHONE AND STATUS CONTROL METHOD THEREOF

BACKGROUND

1. Technical Field

The disclosure relates to wireless communication technologies and, more particularly, to a mobile phone and a status control method adapted for a mobile phone.

2. Description of Related Art

In general packet radio service (GPRS) network, the service area is divided into a number of routing areas (RAs). Each RA is composed of a number of cells. Each cell represents the coverage of a base station. GPRS network uses a pair of finite states machines executed in both the serving GPRS support node (SGSN) and a mobile phone to perform the mobility management (MM) of the mobile phone. The finite status machine has three states: idle state, standby state, and ready state. In the idle state, the GPRS network does not know the existence of the mobile phone. In the standby state, the mobile phone has been attached to the GPRS network, receives, and transmits packet data units (PDUs), and whenever the mobile phone crosses one RA, it is necessary to register to an associated SGSN. In the ready state, whenever the mobile phone crosses one cell, it is necessary to register to an associated SGSN and frequently perform location updates.

To switch from the ready state to the standby state, a ready timer is employed. This approach defines a threshold interval, denoted as T. When a packet is transferred, the ready timer starts to count time in reverse through T time units. If the ready timer has completed the counting and the mobile phone has no data transfer, the mobility management status switches from the ready state to the standby state. However, the ready timer T is a fixed value and frequent location updates waste a lot of power of the mobile phone.

BRIEF DESCRIPTION OF THE DRAWINGS

The components in the drawings are not necessarily drawn to scale, the emphasis instead being placed upon clearly illustrating the principles of the mobile phone. Moreover, in the drawings, like reference numerals designate corresponding parts throughout the several views.

FIG. 2 is a first table of the mobile phone of FIG. 1.

FIG. 3 is a second table of the mobile phone of FIG. 1.

DETAILED DESCRIPTION

Figure 1:
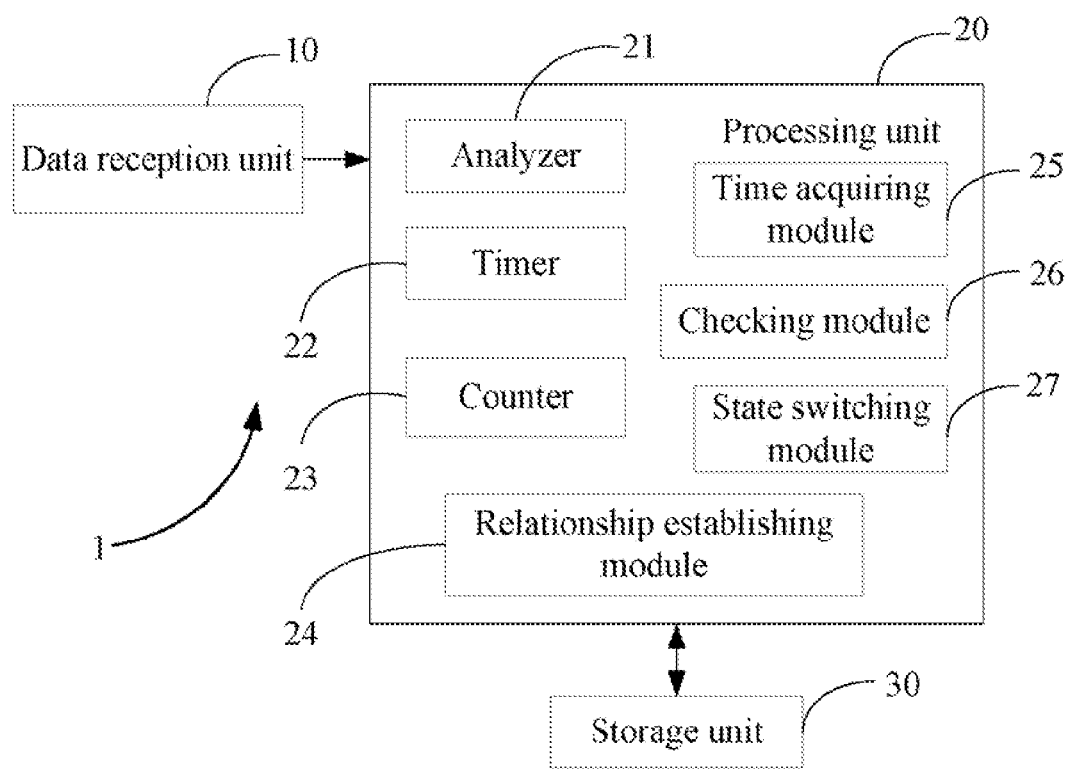
FIG. 1 is a block diagram of a mobile phone in accordance with an embodiment.

FIG. 1 is a block diagram of a mobile phone in accordance with an embodiment. The mobile phone 1 includes a data reception unit 10, a processing unit 20, and a storage unit 30. The data reception unit 10 receives a data packet of an application program provided from the serving GPRS support node (SGSN). The mobile phone 1 installs a number of application programs, such as Web, Map, and MSN. As shown in FIG. 2, each type data packet of each application program is corresponding to a network port number. The first table of FIG. 2 establishes a relationship between the network port number and the type of each application program. The storage unit 30 stores the relationships between the network port numbers and the types of the application programs. For example, Web data packet corresponds to the port number 80, Map data packet corresponds to the port number 100, and MSN data packet corresponds to the port number 60.

The processing unit 20 further includes an analyzer 21, a timer 22, a counter 23, a relationship establishing module 24, a time acquiring module 25, a checking module 26, and a status switching module 27. The analyzer 21 acquires and analyzes the data packet from the data reception unit 10 when the mobility management status enters a ready state, and then obtaining the type of the data packet according to the network port number of the data packet. For convenient description, the running of an application program is defined as an event, for example, when the data reception unit 10 implements data reception, it is considered one event. The timer 22 measures and records time, in the embodiment, the timer 22 records a start time and a stop time of each event.

As shown in FIG. 3, the timer 22 measures and records a start time and a stop time of each event. The counter 23 calculates an interval time of each two adjacent events. For example, the timer 22 records that the start time of a first Web event is 08:09:59 and the stop time is 08:11:50, the start time of a second Web event is 08:12:33 and the stop time is 08:12:43. The counter 23 calculates an interval time T1 of the two adjacent events according to the stop time of the first Web event and the start time of the second Web event, that is, 08:11:50 minus 08:09:59 is 43 s, the first interval time T1 is equal to 43 s.

The counter 23 further counts a number of times of the event runs in a predetermined time period. For example, the counter 23 counts the Web events that happen X times in one weekend. The counter 23 further calculates an average interval time T of each two adjacent events according to the interval time of each two adjacent events and the running times of the events. For the purpose of understanding the present disclosure, take a formula to illustrate how to obtain T, $T=\{T1+T2+\ldots+T(X-1)\}/(X-1)$, wherein $T(X-1)$ represents an interval time of the (X−1)th Web event and the Xth Web event. The relationship establishing module 24 establishes the relationship between the network port number and the type of application program (see FIG. 2), and further records the start time, the stop time, and the average interval time of the application program in the predetermined time period (see FIG. 3) in the storage unit 30.

When the mobile phone 1 has no data transfer, the mobility management status is in the idle state. When the mobile phone 1 activates an application program, e.g., data transfer, the mobility management status switches from the idle state to the ready state, and the data reception unit 10 receives data packet of the application program. The timing acquiring module 25 acquires an average interval time of two adjacent events, e.g., data transfer events, when the mobility management status enters the ready state. The timer 22 starts to measure time. The checking module 26 checks whether the measured time reaches the average interval time of the application program.

When the measured time does not reach the average interval time of the application program, the status switching module 27 controls the mobile phone 1 to maintain at the ready state. When the measured time reaches the average interval time of the application program, for example, the measured time reaches 25 s, the status switching module 27 switches the mobile phone 1 from the ready state to the standby state.

Figure 4:
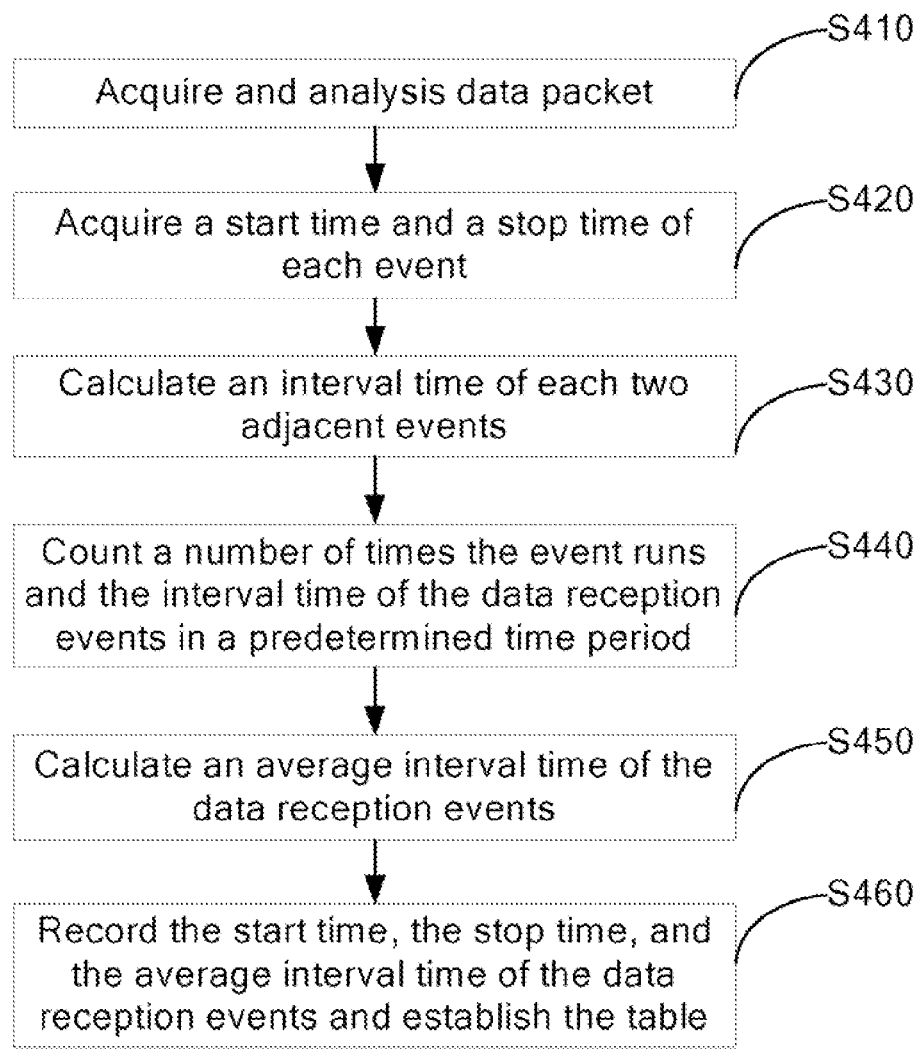
FIG. 4 is a flowchart of establishing the second table of FIG. 3 adapted for the mobile phone of FIG. 1, in accordance with an embodiment.

FIG. 4 is a flowchart of establishing the second table of FIG. 3 adapted for the mobile phone of FIG. 1, in accordance with an embodiment. The data reception unit 10 receives data packet of an application program provided from the SGSN, in step S410, and the analyzer 21 analyzes the data packet from the data transmission unit 10. In step S420, the analyzer 21 further obtains the type of the application program according to the network port number and the timer 22 records a start time and a stop time of each event. In step S430, the counter 23 calculates the interval time of each two adjacent events. In step S440, the counter 23 further counts a number of times of the event runs and the interval time of each two adjacent events in the predetermined time period. In step S450, the counter 23 calculates the average interval time of the application program. In step S460, the relationship establishing module 24 records the start time, the stop time, the average interval time in the second table, and the storage unit 30 stores the table.

Figure 5:
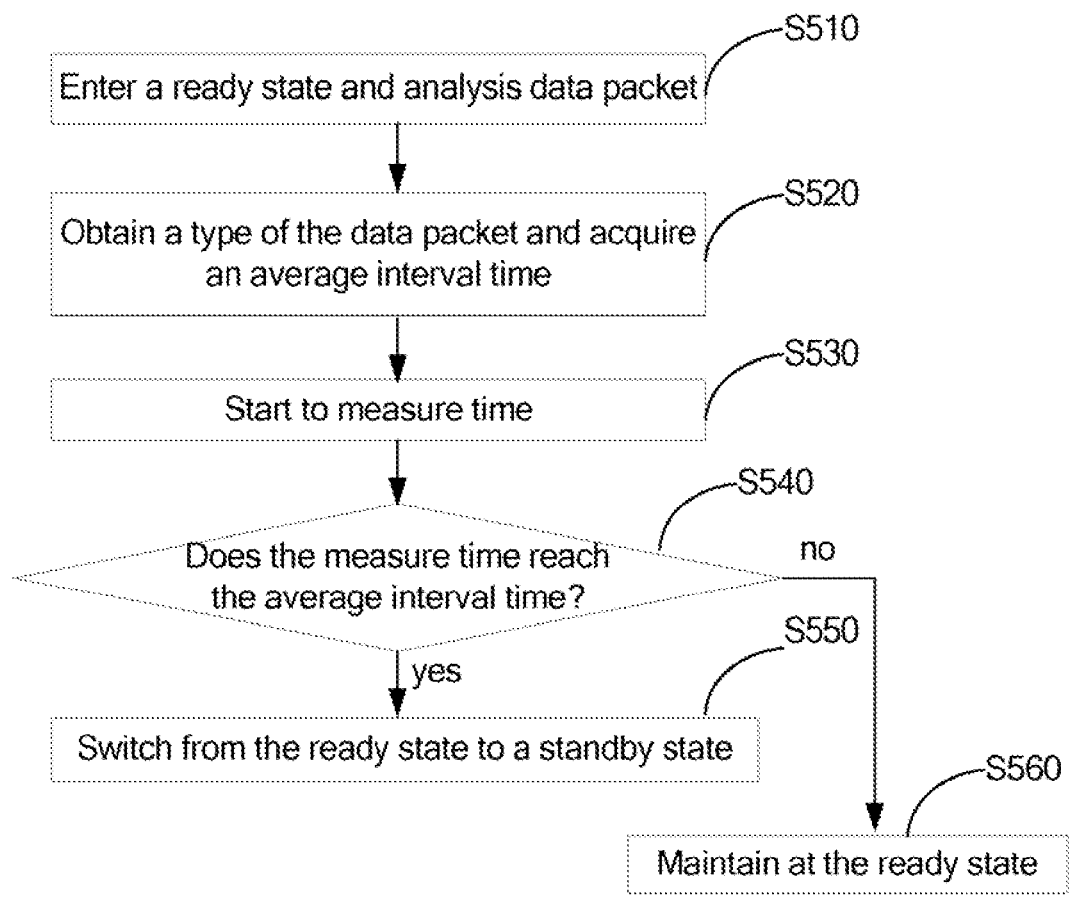
FIG. 5 is a flowchart of a status control method adapted for the mobile phone of FIG. 1, in accordance with an embodiment.

FIG. 5 is a flowchart of a status control method adapted for the mobile phone of FIG. 1, in accordance with an embodiment. The data reception unit 10 receives data packet of an application program provided from the SGSN and the mobility management status enters the ready state, in step S510, and the analyzer 21 analyzes the data packet from the data reception unit 10. In step S520, the analyzer 21 further obtains the type of the application program and the time acquiring module 25 acquires the average interval time of the application program from the table of FIG. 3. In step S530, the timer 22 starts to measure time.

In step S540, the checking module 26 checks whether the measured time reaches the average interval time in the storage unit 30. If no, the procedure turns to the step S560, the mobility management state of the mobile phone 1 maintains at the ready state. If yes, the procedure turns to the step S550, the status switching module 27 controls the mobile phone 1 to switch from the ready state to the standby state.

Therefore, when a waiting time of the mobile phone 1 reaches the average interval time of the application program in the ready state, the mobile phone 1 enters the standby state in advance, and thus the mobile phone 1 does not need send updated location information to the SGSN and saves a lot of power.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A mobile phone comprising:
    a data reception unit for receiving a data packet of an application program from a wireless network to the mobile phone, wherein the data reception is considered as an event;
    a timer for measuring a start time and a stop time of the event which is counted as the application program running one time;
    a counter for counting a number of times the event runs and an interval time of two adjacent events in a plurality of events and then calculating an average interval time of the application program in a predetermined time period;
    a checking module for checking whether a measured time of the timer reaches the average interval time of the application program when the mobile phone enters a ready state; and
    a status switching module for switching the mobile phone from the ready state to a standby state when the measured time reaches the average interval time.

2. The mobile phone as recited in claim 1, wherein the status switching module is further configured for maintaining the mobile phone at the ready state when the measured time does not reach the average interval time.

3. The mobile phone as recited in claim 1, further comprising a time acquiring module for acquiring the average interval time of the application program when the mobile phone enters the ready state.

4. The mobile phone as recited in claim 1, further storing a table between a network port number and a type of data packet.

5. The mobile phone as recited in claim 4, further comprising an analyzer for analyzing the data packet and obtaining a type of the data packet according to the network port number in the table when the data reception unit receives the data packet.

6. The mobile phone as recited in claim 1, wherein the average interval time is defined as T, which is acquired by a formula: $T=\{T1+T2+\ldots+T(X-1)\}/(X-1)$, wherein $T(X-1)$ represents an interval time of an $(X-1)$th event and an Xth event in the plurality of events.

7. A status control method adapted for a mobile phone comprising:
    receiving a data packet of an application program from a wireless network to the mobile phone, wherein the data reception is considered as an event;
    measuring a start time and a stop time of the event which is counted as the application program running one time;
    counting a number of times the event runs and an interval time of two adjacent events in a plurality of events and then calculating an average interval time of the application program in a predetermined time period;
    checking whether a measured time reaches the average interval time of the application program when the mobile phone enters a ready state;
    if the measured time does not reach the average interval time, maintaining the mobile phone at the ready state; and
    if the measured time reaches the average interval time, switching the mobile phone from the ready state to a standby state.

8. The status control method as recited in claim 7, further comprising:
    acquiring the average interval time of the application program when the mobile phone enters the ready state.

9. The status control method as recited in claim 7, further comprising:
    storing a table between a network port number and a type of the data packet.

10. The status control method as recited in claim 9, further comprising:
    analyzing the data packet and obtaining the type of the data packet according to the network port number in the table when the mobile phone receives the data packet.

11. The status control method as recited in claim 7, wherein the average interval time is defined as T, which is acquired by a formula: $T=\{T1+T2+\ldots+T(X-1)\}/(X-1)$, wherein $T(X-1)$ represents an interval time of an $(X-1)$th event and an Xth event in the plurality of events.

* * * * *